(12) United States Patent
Fink et al.

(10) Patent No.: US 6,603,911 B2
(45) Date of Patent: Aug. 5, 2003

(54) OMNIDIRECTIONAL MULTILAYER DEVICE FOR ENHANCED OPTICAL WAVEGUIDING

(75) Inventors: Yoel Fink, Cambridge, MA (US);
Shanhui Fan, Somerville, MA (US);
Edwin Thomas, Natick, MA (US);
Chiping Chen, Needham, MA (US);
John Joannopoulos, Belmont, MA (US)

(73) Assignee: Massachusetts Institute of Technology, Cambridge, MA (US)

(*) Notice: Subject to any disclaimer, the term of this patent is extended or adjusted under 35 U.S.C. 154(b) by 0 days.

(21) Appl. No.: 10/210,493
(22) Filed: Aug. 1, 2002
(65) Prior Publication Data
US 2002/0191929 A1 Dec. 19, 2002

Related U.S. Application Data

(63) Continuation of application No. 09/418,344, filed on Oct. 14, 1999, now Pat. No. 6,463,200.
(60) Provisional application No. 60/104,153, filed on Oct. 14, 1998.

(51) Int. Cl.[7] .................................................. G02B 6/16
(52) U.S. Cl. ........................................ 385/123; 385/126
(58) Field of Search ............................... 385/122, 123, 385/124, 125, 126–129, 133; 359/500; 428/212, 480, 483, 522

(56) References Cited

U.S. PATENT DOCUMENTS

| | | |
|---|---|---|
| 4,852,968 A | 8/1989 | Reed |
| 5,185,827 A | 2/1993 | Poole .......................... 385/28 |
| 5,261,016 A | 11/1993 | Poole .......................... 385/28 |
| 5,448,674 A | 9/1995 | Vengsarkar et al. ........ 385/123 |

(List continued on next page.)

FOREIGN PATENT DOCUMENTS

| | | |
|---|---|---|
| EP | 0 060 085 | 9/1982 |
| EP | 0 195 630 | 9/1986 |
| EP | 0 426 203 | 5/1991 |
| GB | 2288469 | 10/1995 |

(List continued on next page.)

OTHER PUBLICATIONS

A. G. Bulushev et al. "Spectrally selective mode conversion at in homogeneities of optical fibers," Sov. Tech. Phys. Lett., 14, 506–507 (1988).

A. N. Lazarchik, "Bragg fiber lightguides," Radiotekhnika i electronika, 1, 36–43 (1988).

C. M. de Sterke et al., "Differential losses in Bragg fibers," J. Appl. Phys., 76, 680–688 (1994).

C. Moeller, "Mode converters in the Doublet III ECH microwave system," Int. J. Electronics, 53, 587–593 (1982).

D. Marcuse et al., "Mode conversion caused by diameter changes of a round dielectric waveguide," Bell Syst. Tech. J., 48, 3217–3232 (1969).

(List continued on next page.)

Primary Examiner—Phan T. H. Palmer
(74) Attorney, Agent, or Firm—Fish & Richardson P.C.

(57) ABSTRACT

A device having at least one dielectric inner core region in which electromagnetic radiation is confined, and at least two dielectric outer regions surrounding the inner core region, each with a distinct refractive index. The outer regions confine electromagnetic radiation within the inner core region. The refractive indices, the number of outer regions, and thickness of the outer regions result in a reflectivity for a planar geometry that is greater than 95% for angles of incidence ranging from 0° to at least 80° for all polarizations for a range of wavelengths of the electromagnetic radiation. In exemplary embodiments, the inner core region is made of a low dielectric material, and the outer regions include alternating layers of low and high dielectric materials. In one aspect of the invention, the device is a waveguide, and in another aspect the device is a microcavity.

53 Claims, 7 Drawing Sheets

U.S. PATENT DOCUMENTS

| | | | |
|---|---|---|---|
| 5,641,956 A | 6/1997 | Vengsarkar et al. | 250/227.14 |
| 5,661,839 A | 8/1997 | Whitehead | 385/131 |
| 5,814,367 A | 9/1998 | Hubbard et al. | 427/162 |
| 5,882,774 A | 3/1999 | Jonza et al. | 428/212 |
| 5,894,537 A | 4/1999 | Berkey et al. | 385/125 |
| 5,995,696 A | 11/1999 | Miyagi et al. | 385/125 |
| 6,043,914 A | 3/2000 | Cook et al. | 359/124 |
| 6,044,191 A | 3/2000 | Berkey et al. | 385/123 |
| 6,080,467 A * | 6/2000 | Weber et al. | 428/212 |
| 6,101,032 A | 8/2000 | Wortman et al. | 359/500 |
| 6,154,318 A | 11/2000 | Austin et al. | 359/584 |
| 6,175,671 B1 | 1/2001 | Roberts | 385/14 |
| 6,301,421 B1 | 10/2001 | Wickham et al. | 385/126 |
| 6,334,019 B1 | 12/2001 | Birks et al. | 385/125 |
| 6,349,163 B1 | 2/2002 | Antos et al. | 385/127 |
| 6,380,551 B2 | 4/2002 | Abe et al. | 257/15 |
| 6,389,197 B1 | 5/2002 | Iltchenko et al. | 385/28 |
| 6,404,966 B1 | 6/2002 | Kawanishi et al. | 385/125 |
| 6,463,200 B2 * | 10/2002 | Fink et al. | 385/123 |

FOREIGN PATENT DOCUMENTS

| | | |
|---|---|---|
| JP | 2000-035521 | 2/2000 |
| JP | 2001-051244 | 2/2001 |
| WO | WO 94/09393 | 4/1994 |
| WO | WO 94/16345 | 7/1994 |
| WO | WO 97/01774 | 1/1997 |
| WO | WO 99/47465 | 9/1999 |
| WO | WO 99/49340 | 9/1999 |
| WO | WO 99/49341 | 9/1999 |
| WO | WO 00/22466 | 4/2000 |
| WO | WO 00/51268 | 8/2000 |
| WO | WO 00/51269 | 8/2000 |
| WO | WO 00/77549 | 12/2000 |

OTHER PUBLICATIONS

D. Marcuse, "Theory of dielectric optical waveguides," (Academic, New York, 1974).

E. Luneville et al., "An original approach to mode converter optimum design," IEEE Trans. Microwave Theory Tech., 46, (1998).

E. Marcatili et al., "Hollow metallic and dielectric waveguides for long distance optical transmission and lasers," Bell Syst. Tech. J., 43, 1783–1809 (1964).

E. Peral et al., "Supermodes of grating–coupled multimode waveguides and application to mode conversion between copropagating modes mediated by backward Bragg scattering," J. Lightwave Tech., 17, 942–947 (1999).

G.H. Childs, "50mm diameter $TE_{01}$ mode helical waveguide optimization," Electronics Lett., 14, 140–141 (1978).

H. F. Taylor, "Bending effects in optical fibers," J. Lightwave Tech., 2, 617–628 (1984).

H. Kumric et al., "Optimized overmoded $TE_{01}$–to–$TM_{11}$ mode converters for high–power millimeter wave applications at 70 and 140 GHz," Int. J. Infrared Millim. Waves, 7, 1439–1463 (1986).

H. Kumric et al., "Optimization of mode converters for generating the fundamental $TE_{01}$ mode from $TE_{06}$ gyrotron output at 140 GHz," Int. J. Electron, 64, 77–94 (1988).

H.Yajima, "Dielectric bypass waveguide mode order converter," IEEE J. Quantum Electronics, 15, 482–487 (1979).

I. Gannot, et al., "Current Status of Fexible Waveguides for IR Laser Radiation Transmission", IEEE J. Sel. Topics in Quantum Electr., IEEE Service Center, vol. 2, No. 4, pp. 880–888 (Dec. 1996); XP000694378.

I.K. Hwang et al., "Long–period fiber gratings based on periodic microbends," Opt. Lett., 24, 1263–1264 (1999).

J.C. Knight et al., "Photonic band gap guidance in optical fibers" Science 282, 1476–1478 (1998).

J. J. Refi, "Optical fibers for optical networking," Bell Labs Technical Journal, 4,246–261 (1999).

J. N. Blake et al., "Fiber–optic modal coupler using periodic microbending," Opt;. Lett., 11, 177–179 (1986).

J. S. Levine, "Rippled wall mode converters for circular waveguide," Int. J. Infrared Millim. Waves, 5, 937–952 (1984).

J.W. Hahn et al., "Measurement of nonreasonant third–order susceptibilities of various gases by the nonlinear interferometric technique," J. Opt. Soc. Am. B, 12, 1021–1027 (1995).

K. J. Bunch et al., "The helically wrapped circular waveguide," IEE Trans. Electron Devices, 34, 1873–1884 (1987).

K. O. Hill et al., "Efficient mode conversion in telecommunication fiber using externally written gratings," Electron. Lett., 26, 1270–1272 (1990).

L. Dong et al., "Intermodal coupling by periodic microbending in dual–core fibers—comparison of experiment and theory," J. Lightwave Tech., 12, 24–27 (1994).

L. M. Field, "Some slow–wave structures for traveling–wave tubes," Proc. IRE, 37, 34–40 (1949).

Lars Gruner–Nielson et al., "New dispersion compensating fibres for simultaneous compensation of dispersion and dispersion slope of non–zero dispersion shifted fibres in the C or L band", OFC '00.

M. J. Buckley et al., "A single period $TE_{02}$–$TE_{01}$ mode converter in a highly overmoded circular waveguide," IEEE Trans. Microwave Theory Tech., 39, 1301–1306 (1991).

M. J. Weber et al., "Measurements of the electronic and nuclear contributions to the nonlinear refractive index of beryllium fluoride glasses," Appl. Phys. Lett., 32, 403–405 (1978).

M. Miyagi, et al., "Transmission characteristics of dielectric–coated metallic waveguides for infrared transmission: slab waveguide model", IEEE J. Quantum Elec. QE–19, 136–145 (1983).

M. Miyagi, et al., "Wave propagation and attenuation in the general class of circular hollow waveguides with uniform curvature", IEEE Trans. Microwave Theory Tech. MTT–32, 513–521 (1984).

M. Otsuka et al., "Development of mode converters for 28 GHz electron cyclotron heating system," Int. J. Electron, 70, 989–1004 (1991).

M. Thumm, "High powr millimeter–wave mode converters in overmoded circular waveguides using periodic wall pertubations," Int. J. Electron., 57, 1225–1246 (1984).

Mitsunobu Miyagi et al., "Design theory of dielectric–coated circular metallic waveguides for infrared transmission," J. Lightwave Tech., vol. LT–2, 116–126, Apr. 1984.

N. J. Doran et al., "Cylindrical Bragg fibers: a design and feasibility study for optical communications," J. Lightwave Tech., 1, 588–590 (1983).

Pochi Yeh et al., "Theory of Bragg fiber," J. Opt. Soc. Am., vol. 68, 1196–1201 Sep. 9, 1978.

R. F. Cregan et al., "Single–mode photonic band gap guidance of light in air," Science, 285, 1537–1539 (1999).

R.A. Abram et al., "Mode conversion in an imperfect waveguide," J. Phys. A, 6, 1693–1708 (1973).

S. Ahn et al., "Analysis of helical waveguide," IEEE Trans. Electron Devices, 33, 1348–1355 (1986).

S. H. Yun et al., "All–fiber tunable filter and laser based on two–mode fiber," Opt. Lett., 21, 27–29 (1996).

S.P. Morgan, "Theory of curved circular waveguide containing an inhomogeneous dielectric," Bell Syst. Tech. J., 36, 1209–1251 (1957).

T. Cardinal et al., "Nonlinear optical properties of chalcogenide glasses in the system As–S–Se," J. Non–Cryst. Solids, 256, 353–360 (1999).

T. Iyama et al., Propagtion characteristics of a dielectric-coated coaxial helical waveguide in a lossy medium, IEEE Trans. Microwave Theory Tech., 45, 557–559 (1997).

T. Liang et al., "Mode conversion of ultrafast pulses by grating structures in layered dielectric waveguides," J. Lightwave Tech., 1966–1973 (1997).

T. M. Monro et al., "Holey Optical Fibers: An efficient modal model," IEEE J. Lightwave Technol., 17, 1093–1102 (1999).

T. ul Hag et al., "Optimized irregular structures for spatial- and temporal–field transformation," IEEE Trans. Microwave Theory Tech., 46, 1856–1867 (1998).

Y. Fink et al., "A dielectric omnidirectional reflector," Science, 282, 1679–1682 (1998).

Y. Fink et al., "Guiding optical light in air using an all–dielectric structure," J. Lightwave Tech., 17, 2039–2041 (1999).

Y. W. Li et al., "Triple–clad single–mode fibers for dispersion shifting," IEEE J. Lightwave Technol., 11, 1812–1819 (1993).

F. Brechet et al., "Analysis of bandpass filtering behavior of singlemode depressed–core–index photonic bandgap fibre," Elec. Lett., 36, 870–872 (2000).

F. Brechet et al., "Singlemode propagation into depressed-–core–index photonic–bandgap fibre designed for zero–dispersion propagation at short wavelengths," Elec. Lett., 36, 514–515 (2000).

* cited by examiner

| ANGLE OF INCIDENCE (DEGREES) | $\xi_{TM}$ ($\mu m$) | $\xi_{TE}$ ($\mu m$) |
|---|---|---|
| 0 | 2.51 | 2.51 |
| 45 | 3.05 | 2.43 |
| 80 | 4.60 | 2.39 |

*FIG. 5*

OMNIDIRECTIONAL MULTILAYER DEVICE FOR ENHANCED OPTICAL WAVEGUIDING

PRIORITY INFORMATION

This application is a continuation of application Ser. No. 09/418,344, filed Oct. 14, 1999, now U.S. Pat. No. 6,463,200 which claims priority from provisional application Ser. No. 60/104,153 filed Oct. 14, 1998.

STATEMENT REGARDING FEDERALLY SPONSORED RESEARCH OR DEVELOPMENT

This invention was made with government support under Grant Number DAAG55-97-1-0366, awarded by the Army, Grant Number F49620-97-1-0325 awarded by the Air Force and Grant Number 94003 34-DMR awarded by NSF. The government has certain rights in the invention.

BACKGROUND OF THE INVENTION

The invention relates to the field of optical waveguiding, and in particular to an omnidirectional multilayered device for enhanced waveguiding of electromagnetic radiation.

Mirrors are probably the most prevalent of optical devices. Known to the ancients and used by them as objects of worship and beauty, mirrors are currently employed for imaging, solar energy collection and in laser cavities. Their intriguing optical properties have captured the imagination of scientists as well as artists and writers.

One can distinguish between two types of mirrors, the age-old metallic, and more recent dielectric. Metallic mirrors reflect light over a broad range of frequencies incident from arbitrary angles, i.e., omnidirectional reflectance. However, at infrared and optical frequencies, a few percent of the incident power is typically lost due to absorption. Multilayer dielectric mirrors are used primarily to reflect a narrow range of frequencies incident from a particular angle or particular angular range. Unlike their metallic counterparts, dielectric reflectors can be extremely low loss.

The ability to reflect light of arbitrary angle of incidence for all-dielectric structures has been associated with the existence of a complete photonic bandgap, which can exist only in a system with a dielectric function that is periodic along three orthogonal directions. In fact, a recent theoretical analysis predicted that a sufficient condition for the achievement of omnidirectional reflection in a periodic system with an interface is the existence of an overlapping bandgap regime in phase space above the light cone of the ambient media.

The theoretical analysis is now extended to provide experimental realization of a multilayer omnidirectional reflector operable in infrared frequencies. The structure is made of thin layers of materials with different dielectric constants (polystyrene and tellurium) and combines characteristic features of both the metallic and dielectric mirrors. It offers metallic-like omnidirectional reflectivity together with frequency selectivity and low-loss behavior typical of multilayer dielectrics.

SUMMARY OF THE INVENTION

Accordingly, in accordance with the invention there is provided a device having at least one inner core region in which electromagnetic radiation is confined, and at least two outer regions surrounding the inner core region, each with a distinct refractive index. The outer regions confine electromagnetic radiation within the inner core region. The refractive indices, the number of outer regions, and thickness of the outer regions result in a reflectivity for a planar geometry that is greater than 95% for angles of incidence ranging from 0° to at least 80° for all polarizations for a range of wavelengths of the electromagnetic radiation. In exemplary embodiments, the inner core region is made of a low dielectric material, and the outer regions include alternating layers of low and high dielectric materials. In one aspect of the invention, the device is a waveguide, and in another aspect the device is a microcavity.

BRIEF DESCRIPTION OF THE DRAWINGS

FIG. 5 is a table showing that $\xi$ is a monotonically increasing function of the incident angle for the TM mode of an omnidirectional reflector;

DETAILED DESCRIPTION OF THE INVENTION

Figure 1:
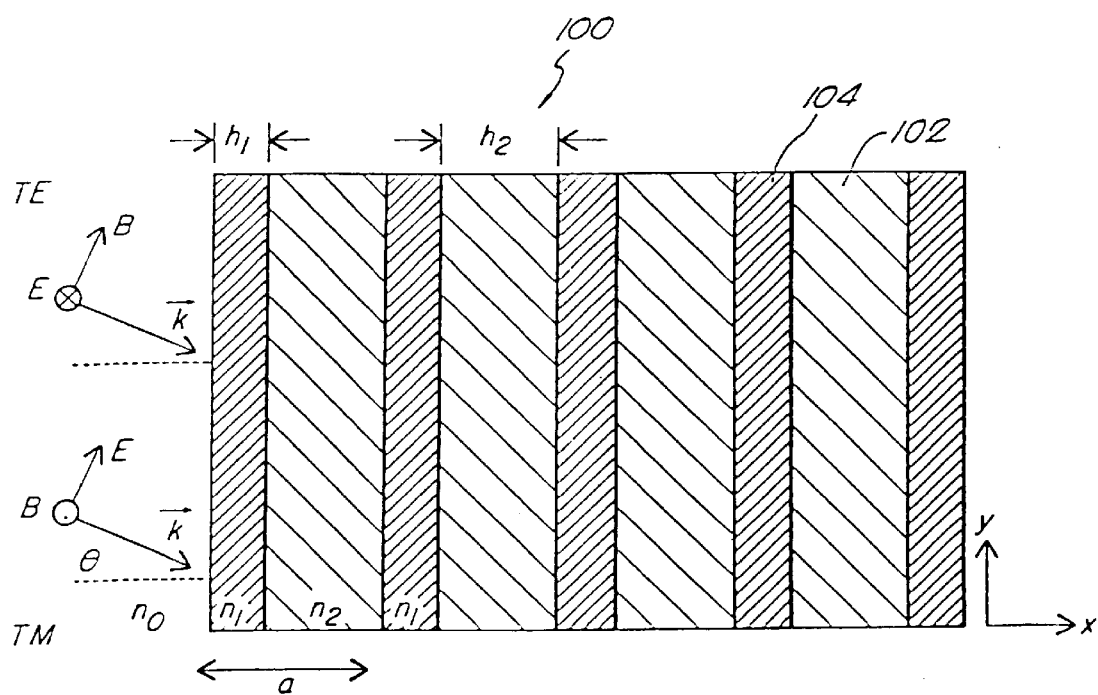
FIG. 1 is a simplified block diagram of an exemplary embodiment of a multilayer periodic dielectric film structure in accordance with the invention.

FIG. 1 is a simplified block diagram of an exemplary embodiment of a multilayer periodic dielectric film structure 100 in accordance with the invention. The structure is made of an array of alternating dielectric layers 102,104 coupled to a homogeneous medium, characterized by $n_0$ (such as air with $n_0=1$), at the interfaces. Electromagnetic waves are incident upon the multilayer film from the homogeneous medium. The possibility of omnidirectional reflectivity for such a system has now been recognized. $h_1$ and $h_2$ are the layer thickness, and $n_1$ and $n_2$ are the indices of refraction of the respective layers 104 and 102.

An exemplary incident wave has a wave vector $\vec{k}=k_x\hat{e}_x+k_y\hat{e}_y$ frequency of $\omega=c|k|$. The wave vector together with the normal to the periodic structure 100 defines a mirror plane of symmetry that allows distinguishing between two independent electromagnetic modes: transverse electric (TE) modes and transverse magnetic (TM) modes. For the TE mode, the electric field is perpendicular to the plane, as is the magnetic field for the TM mode. The distribution of the electric field of the TE mode (or the magnetic field in the TM mode) in a particular layer within the stratified structure can be written as a sum of two plane waves traveling in opposite directions. The amplitudes of the two plane waves in a particular layer α of one cell are related to the amplitudes in the same layer of an adjacent cell by a unitary 2×2 translation matrix $U^{(\alpha)}$.

General features of the transport properties of the finite structure can be understood when the properties of the infinite structure are elucidated. In a structure with infinite number of layers, translational symmetry along the direction perpendicular to the layers leads to Bloch wave solutions of the form $$E_K(x,y) = E_K(x) e^{iKx} e^{ik_y y}, \quad (1)$$

where $E_K(x)$ is periodic, with a period of length α, and K is the Bloch wave number given by $$K = \frac{i}{a} \ln\left( \frac{1}{2} Tr(U^{(\alpha)}) \pm \left( \frac{1}{4}(Tr(U^{(\alpha)}))^2 - 1 \right)^{1/2} \right). \quad (2)$$

Solutions of the infinite system can be propagating or evanescent, corresponding to real or imaginary Bloch wave numbers, respectively. The solution of Eq. 2 defines the band structure for the infinite system, $\omega(K,k_y)$.

Figure 2A:
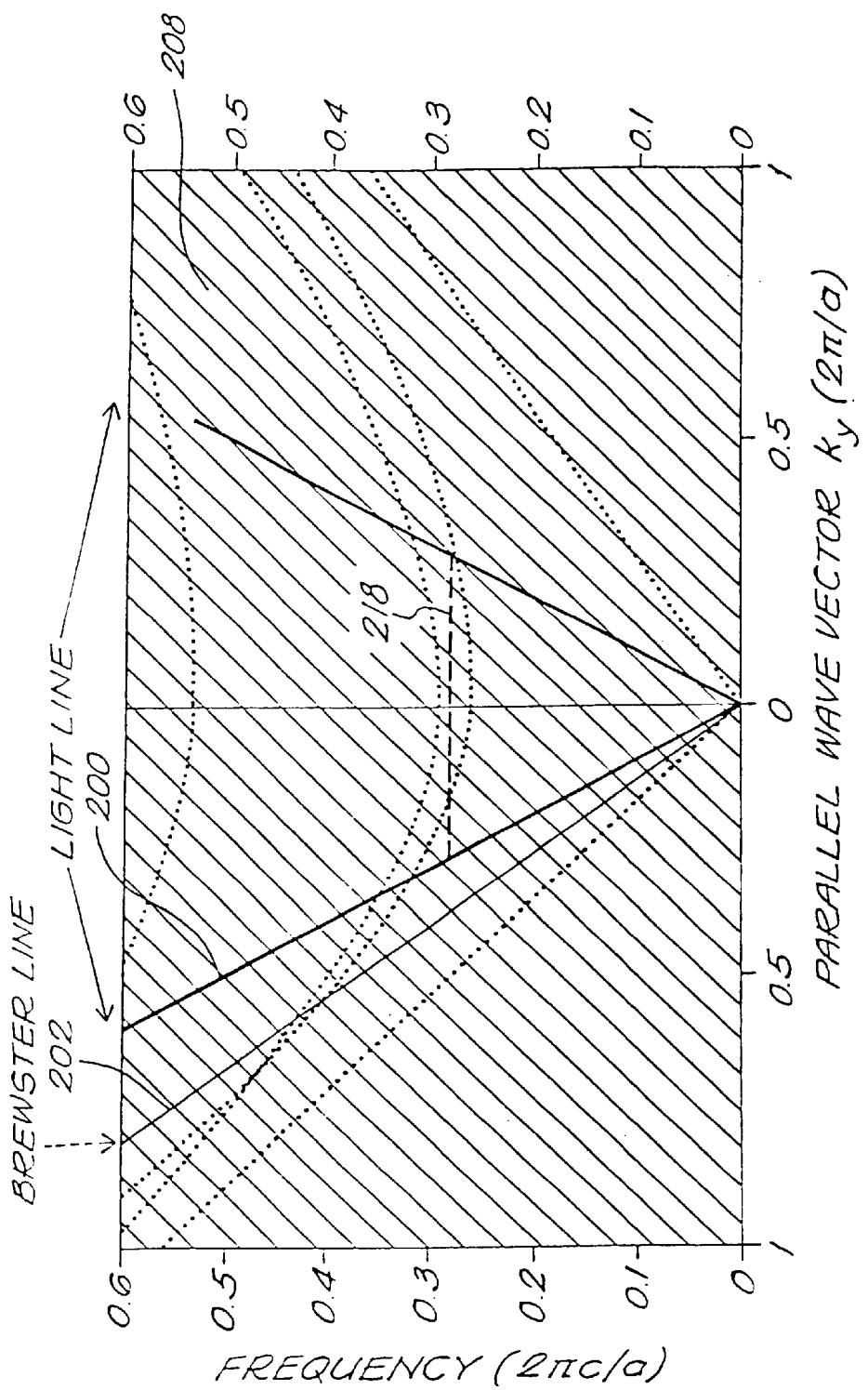
FIG. 2A is a graph of the projected band structure of a multilayer film with a light line and Brewster line, exhibiting a reflectivity range of limited angular acceptance.
Figure 2B:
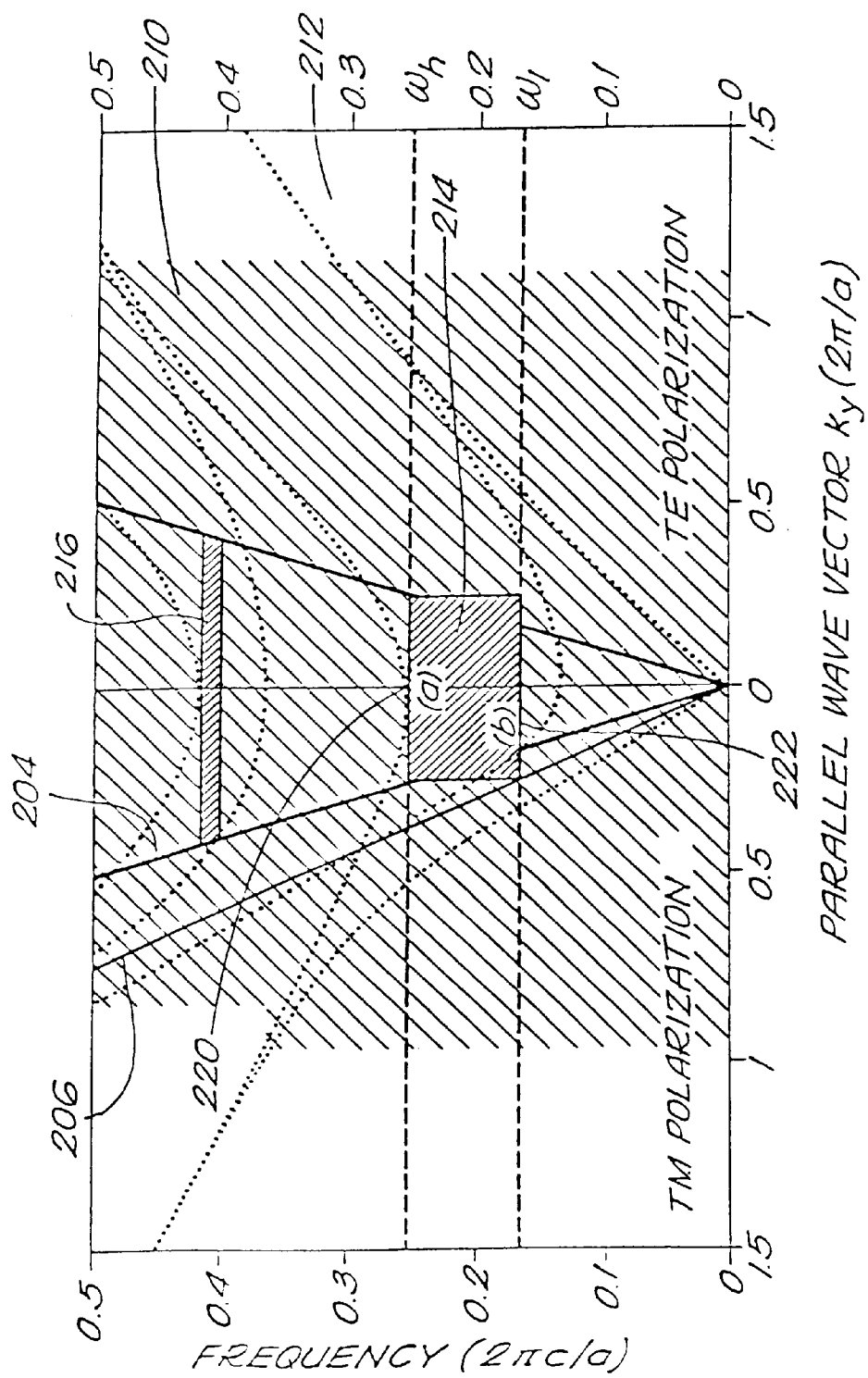
FIG. 2B is a graph of the projected band structure of a multilayer film together with the light line and Brewster line, showing an omnidirectional reflectance range at the first and second harmonic.

It is convenient to display the solutions of the infinite structure by projecting the $\omega(K,k_y)$ function onto the $\omega$-$k_y$ plane. FIGS. 2A and 2B are examples of such projected structures.

FIG. 2A is a graph of the projected band structure of a multilayer film with a light line 200 and Brewster line 202, exhibiting a reflectivity range of limited angular acceptance with $n_1=2.2$ and $n_2=1.7$, and a thickness ratio of $h_2/h_1=2.2/1.7$.

FIG. 2B is a graph of the projected band structure of a multilayer film together with the light line 204 and Brewster line 206, showing an omnidirectional reflectance range at the first and second harmonic. The film parameters are $n_1=4.6$ and $n_2=1.6$ with a thickness ratio of $h_2/h_1=1.6/0.8$. These parameters are similar to the actual polymer-tellurium film parameters measured in the experiment.

The area 208 and 210 (light gray) highlight phase space where K is strictly real, i.e., regions of propagating states. The area 212 (white) represents regions containing evanescent states. The areas 214 and 216 represent omnidirectional reflectance ranges.

The shape of the projected band structures for the multilayer film structure can be understood intuitively. At $k_y=0$ the bandgap for waves travelling normal to the layers is recovered. For $k_y>0$, the bands curve upward in frequency. As $k_y \to \infty$, the modes become largely confined to the slabs with the high index of refraction and do not couple between layers (and are therefore independent of $k_x$).

For a finite structure, the translational symmetry in the directions parallel to the layers is preserved, hence $k_y$ remains a conserved quantity. In the direction perpendicular to the layers, the translational symmetry no longer exists. Nevertheless, the K-number, as defined in Eq. 2, is still relevant, because it is determined purely by the dielectric and structural property of a single bilayer. In regions where K is imaginary, the electromagnetic field is strongly attenuated. As the number of layers is increased, the transmission coefficient decreases exponentially, while the reflectivity approaches unity.

Since the primary interest is in waves originating from the homogeneous medium external to the periodic structure, the focus will be only on the portion of phase space lying above the light line. Waves originating from the homogeneous medium satisfy the condition $\omega \geq ck_y/n_0$, where $n_0$ is the refractive index of the homogeneous medium, and therefore they must reside above the light line. States of the homogeneous medium with $k_y=0$ are normal incident, and those lying on the $\omega=ck_y/n_0$ line with $k_x=0$ are incident at an angle of 90°.

The states in FIG. 2A that are lying in the restricted phase space defined by the light line 200 and that have a ($\omega$, $k_y$) corresponding to the propagating solutions (gray areas 208) of the structure can propagate in both the homogeneous medium and in the structure. These waves will partially or entirely transmit through the film. Those with ($\omega$, $k_y$) in the evanescent regions (white areas 212) can propagate in the homogeneous medium, but will decay in the structure. Waves corresponding to this portion of phase space will be reflected off the structure.

The multilayer system leading to FIG. 2A represents a structure with a limited reflectivity cone since for any frequency one can always find a $k_y$ vector for which a wave at that frequency can propagate in the structure, and hence transmit through the film. For example, a wave with $\omega=0.285 \, 2\pi c/\alpha$ (dashed horizontal line 218) will be reflected for a range of $k_y$ values ranging from 0 (normal incidence) to $0.285 \, 2\pi/\alpha$ (90° incidence) in the TE mode, while in the TM mode it begins to transmit at a value of $k_y=0.187 \, 2\pi/\alpha$ (~41° incidence). The necessary and sufficient criterion for omnidirectional reflectivity at a given frequency is that there exist no transmitting states of the structure inside the light cone. This criterion is satisfied by frequency ranges 214 and 216 in FIG. 2B. In fact, the system leading to FIG. 2B exhibits two omnidirectional reflectivity ranges.

A necessary condition for omnidirectional reflectivity is that light from outside of the structure cannot be allowed to access the Brewster angle $\theta_B=\tan^{-1}(n_1/n_2)$ of the multilayer structure because at this angle, the TM mode will be transmitted through. This condition is met when the Brewster line lies outside of the light line, or, terms of the refractive indices of the layers, $\sin^{-1}(n_0/n_2)<\theta_B$. A sufficient condition is the existence of a particular frequency at which no propagating mode within the crystal exists between $k_y=0$ and $k_y=\omega/c$.

FIG. 2A is an example of a structure, which does not have an omnidirectional reflectivity range even though its Brewster crossing is inaccessible to light coming from the homogeneous medium (the Brewster crossing lies outside of the light cone). This is due to the large group velocity of modes in the lower band edge of the TM mode which allow every frequency to couple to a propagating state in the crystal. This should be contrasted with FIG. 2B, which exhibits an omnidirectional reflectivity range (area 214). The high indices of refraction actually allow for the opening of an additional omnidirectional reflectivity range (area 216) in the higher harmonic as well.

The omnidirectional range is defined from above by the normal incidence band edge $\omega_h(k_x=\pi/\alpha, k_y=0)$ (point 220), and below by the intersection of the top of the TM allowed band edge with the light line $\omega_l(k_x=\pi/\alpha, k_y=\omega_l/c)$ (point 222).

The exact expression for the band edges is $$\frac{1+\Lambda}{2} \cos(k_x^{(1)} h_1 + k_x^{(2)} h_2) + \frac{1-\Lambda}{2} \cos(k_x^{(1)} h_1 - k_x^{(2)} h_2) + 1 = 0, \quad (3)$$

where $k_x^{(\alpha)} = \sqrt{(\omega n_\alpha/c)^2 - k_h^2}$ ($\alpha=1, 2$) and $$\Lambda \equiv \begin{cases} \frac{1}{2}\left(\frac{k_x^{(2)}}{k_x^{(1)}} + \frac{k_x^{(1)}}{k_x^{(2)}}\right) TE, \\ \frac{1}{2}\left(\frac{n_1^2 k_x^{(2)}}{n_2^2 k_x^{(1)}} + \frac{n_2^2 k_x^{(1)}}{n_1^2 k_x^{(2)}}\right) TM. \end{cases} \quad (4)$$

A dimensionless parameter used to quantify the extent of the omnidirectional reflection range is the range to midrange ratio defined as $$(\omega_h - \omega_l) / \frac{1}{2}(\omega_h + \omega_l).$$

Figure 3:
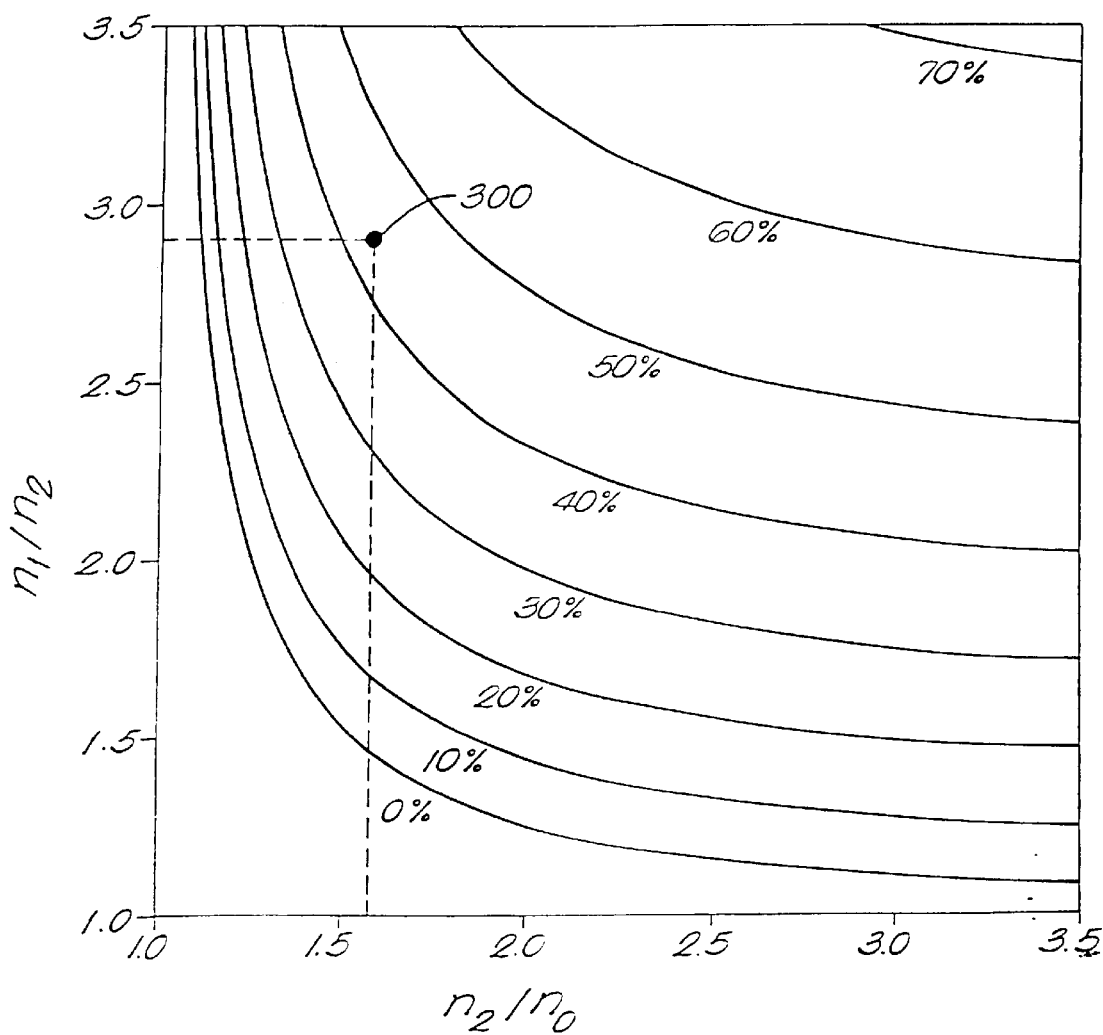
FIG. 3 is a graph of the range to midrange ratio for the fundamental frequency range of omnidirectional reflection plotted as contours.

FIG. 3 is a plot of this ratio as a function of $n_2/n_1$ and $n_1/n_0$ where $\omega_h$ and $\omega_l$ are determined by solutions of Eq. 3 with quarter wave layer thickness, and $n_1 > n_2$. The contours in this figure represent various equi-omnidirectional ranges for different material index parameters and could be useful for design purposes. The ratio for the exemplary materials is approximately 45% ($n_1/n_2=2.875$, $n_2/n_0=1.6$), and it is located at the intersection of the dashed lines at point 300.

It may also be useful to have an approximate analytical expression for the extent of the gap. This can be obtained by setting $\cos(k_x^{(1)}h_1 - k_x^{(2)}h_2) \cong 1$ in Eq. 3. It is found that for a given incident angle $\theta_0$, the approximate width in frequency is $$\Delta\omega(\theta_0) = \frac{2c}{h_1\sqrt{n_1^2 - n_0^2\sin^2\theta_0} + h_2\sqrt{n_2^2 - n_0^2\sin^2\theta_0}} \quad (5)$$

$$\left[\cos^{-1}\left(-\sqrt{\frac{\Lambda-1}{\Lambda+1}}\right) - \cos^{-1}\left(\sqrt{\frac{\Lambda-1}{\Lambda+1}}\right)\right].$$

At normal incidence there is no distinction between TM and TE modes. At increasingly oblique angles the gap of the TE mode increases, whereas the gap of the TM mode decreases. In addition, the center of the gap shifts to higher frequencies. Therefore, the criterion for the existence of omnidirectional reflectivity can be restated as the occurrences of a frequency overlap between the gap at normal incidence and the gap of the TM mode at 90°. Analytical expressions for the range to midrange ratio can be obtained by setting $$\omega_h + \frac{2c}{h_2 n_2 + h_1 n_1}\cos^{-1}\left(-\left|\frac{n_1 - n_2}{n_1 + n_2}\right|\right), \quad (6)$$

$$\omega_1 =$$

$$\frac{2c}{h_2\sqrt{n_2^2 - n_0^2} + h\sqrt{n_2^2 - n_0^2}}\cos^{-1}\left(\left|\frac{n_1^2\sqrt{n_2^2 - n_0^2} - n_2^2\sqrt{n_1^2 - n_0^2}}{n_1^2\sqrt{n_2^2 - n_0^2} + n_2^2\sqrt{n_1^2 - n_0^2}}\right|\right).$$

Moreover, the maximum range width is attained for thickness values that are not equal to the quarter wave stack though the increase in bandwidth gained by deviating from the quarter wave stack is typically only a few percent.

In general, the TM mode defines the lower frequency edge of the omnidirectional range. An example can be seen in FIG. 2B for a particular choice of the indices of refraction. This can be proven by showing that $$\left.\frac{\partial\omega}{\partial k_y}\right|_{TM} \geq \left.\frac{\partial\omega}{\partial k_y}\right|_{TE} \quad (7)$$

in the region that resides inside the light line. The physical reason for Eq. 7 lies in the vectorial nature of the electric field. In the upper portion of the first band the electric field concentrates its energy in the high dielectric regions.

Away from normal incidence the electric field in the TM mode has a component in the direction of periodicity. This component forces a larger portion of the electric field into the low dielectric regions. The group velocity of the TM mode is therefore enhanced. In contrast, the electric field of the TE mode is always perpendicular to the direction of periodicity and can concentrate its energy primarily in the high dielectric region.

A polystyrene-tellurium (PS-Te) materials system was chosen to demonstrate omnidirectional reflectivity. Tellurium has a high index of refraction and low loss characteristics in the frequency range of interest. In addition, its relatively low latent heat of condensation together with the high glass transition temperature of the PS minimizes diffusion of Te into the polymer layer. The choice of PS, which has a series of absorption peaks in the measurement range, demonstrates the competition between reflectivity and absorption that occurs when an absorption peak is located in the evanescent state region. The Te(0.8 $\mu$m) and PS (1.65 $\mu$m) films were deposited sequentially to create a nine-layer film.

A 0.8±0.09 $\mu$m thick layer of tellurium (99.99+%, Strem Chemicals) was vacuum evaporated at $10^{-6}$ torr and 7A (Ladd Industries 30000) onto a NaCl 25 mm salt substrate (polished NaCl window, Wilmad Glass). The layer thickness and deposition rate were monitored in-situ using a crystal thickness monitor (Sycon STM100). A 10% solution of polystyrene (Goodyear PS standard, 110,000 g/mol) in toluene was spin cast at 1000 RPM onto the tellurium coated substrate and allowed to dry for a few hours, the polymer layer thickness was 1.65±0.09 $\mu$m. The nine layer film sequence was Te/PS/Te/PS/Te/PS/Te/PS/Te.

The optical response of this particular multilayer film was designed to have a high reflectivity region in the 10 to 15 $\mu$m range for any angle of incidence (in the experiment we measure from 0° to 80°). The optical response at oblique angles of incidence was measured using a Fourier Transform Infrared Spectrometer (Nicolet 860) fitted with a polarizer (ZnS SpectraTech) and an angular reflectivity stage (VeeMax by SpectraTech). At normal incidence, the reflectivity was measured using a Nicolet Infrared Microscope. A freshly evaporated aluminum mirror was used as a background for the reflectance measurements.

Figure 4:
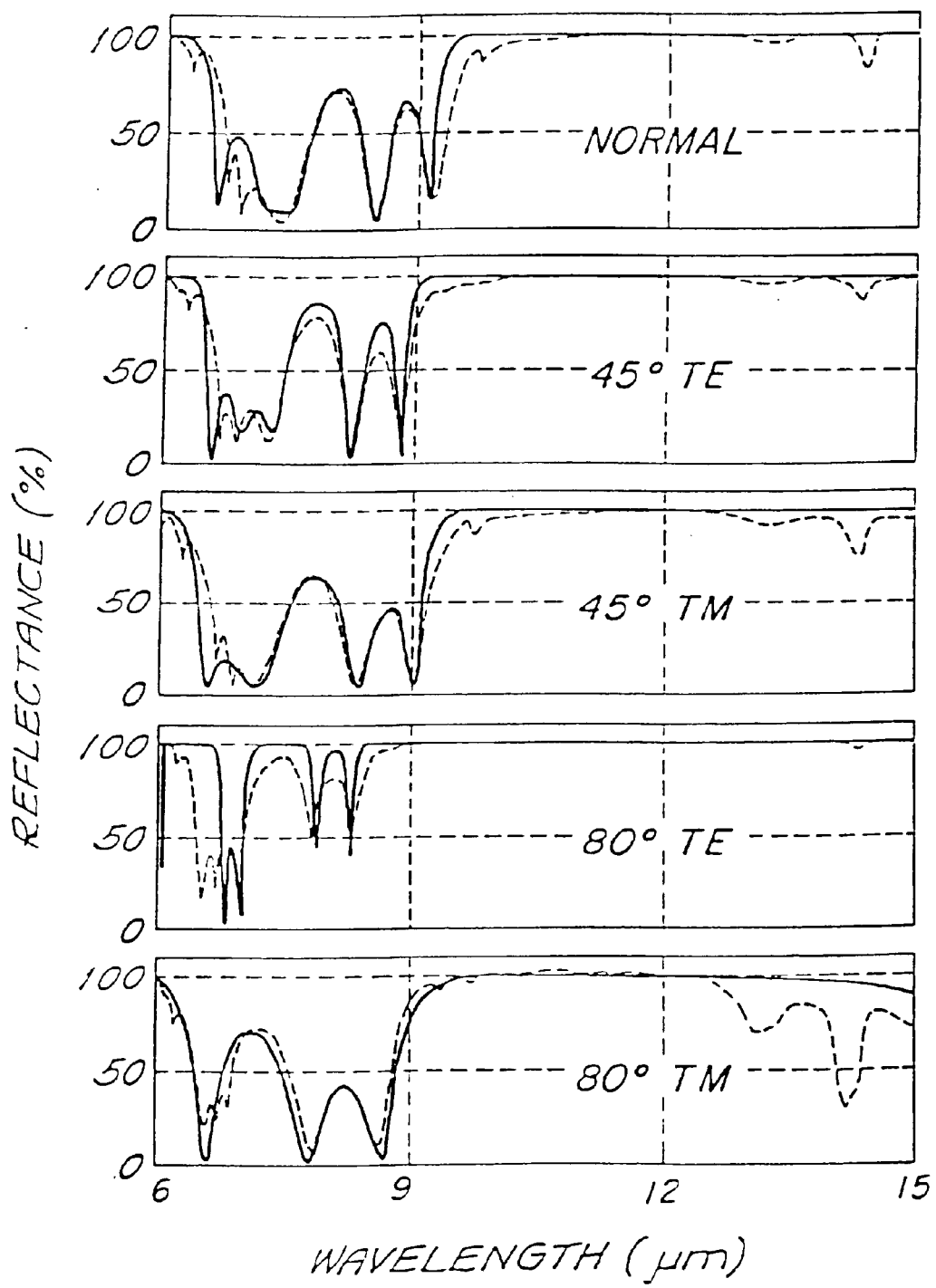
FIG. 4 is a series of graphs showing the calculated (solid line) and measured (dashed line) reflectance (%) as a function of wavelength for TM and TE modes at normal, 45°, and 80° angles of incidence, thus showing an omnidirectional reflectivity band.

FIG. 4 is a series of graphs showing the calculated (solid line) and measured (dashed line) reflectance (%) as a function of wavelength for TM and TE modes at normal, 45°, and 80° angles of incidence, thus showing an omnidirectional reflectivity band. FIG. 4 illustrates the good agreement between the calculated and measured reflectance spectra. The calculations were done using the transfer matrix method described in F. Abeles, Ann. De Physique 5, 706 (1950), incorporated herein by reference, using the film parameters.

The regimes of high reflectivity at the different angles of incidence overlap, thus forming a reflective range of frequencies for light of any angle of incidence. The frequency location of the omnidirectional range is determined by the layer thickness and can be tuned to meet specifications. The range is calculated from Eq. 6 to be 5.6 μm and the center wavelength is 12.4 μm corresponding to a 45% range to midrange ratio shown in dashed lines in FIG. 3 for the experimental index of refraction parameters. These values are in agreement with the measured data. The calculations are for lossless media and therefore do not predict the PS absorption band at ~13 and 14 microns. The PS absorption peak is seen to increase at larger angles of incidence for the TM mode, and decrease for the TE mode.

The physical basis for this phenomena lies in the relation between the penetration depth and the amount of absorption. The penetration length is $\xi$ Im(1/K), with K the Bloch wave number. It can be shown that $\xi$ is a monotonically increasing function of the incident angle for the TM mode of an omnidirectional reflector, and is relatively constant for the TE mode. Thus, the TM mode penetrates deeper into the structure at increasing angles of incidence and is more readily absorbed, as is shown in the table of FIG. 5. The magnitude of the imaginary part of the Bloch wave number for a mode lying in the gap is related to its distance from the band edges. This distance increases in the TE mode due to the widening of the gap at increasing angles of incidence and decreases in the TM mode due to the shrinking of the gap.

The PS-Te structure does not have a complete photonic bandgap. Its omnidirectional reflectivity is due instead to the restricted phase space available to the propagating states of the system. The materials and processes were chosen for their low cost and applicability to large area coverage. In addition to omnidirectionality, the measurements show that a polymer, while lossy in the infrared, can still be used for reflection applications without a considerable sacrifice of performance. The possibility of achieving omnidirectional reflectivity itself is not associated with any particular choice of materials and can be applied to many wavelengths of interest. The structure of the invention offers metallic-like omnidirectional reflectivity for a wide range of frequencies, and at the same time is of low loss. In addition, it allows the flexibility of frequency selection.

In accordance with the invention, the confinement of light in cavities and wave guides using an omnidirectional multilayer film will now be described. The multilayer film structure has been described in co-pending application Ser. No. 09/253,379 filed Feb. 19, 1999 and Ser. No. 09/267,854 filed Mar. 12, 1999, of common assignee, and incorporated herein by reference. Specifically, a method is presented for creating very low loss broad band optical fibers, which are capable of transmitting around sharp bends. In addition, a design is presented for improving the delivering power of a near field optical fiber tip.

Figure 6A:
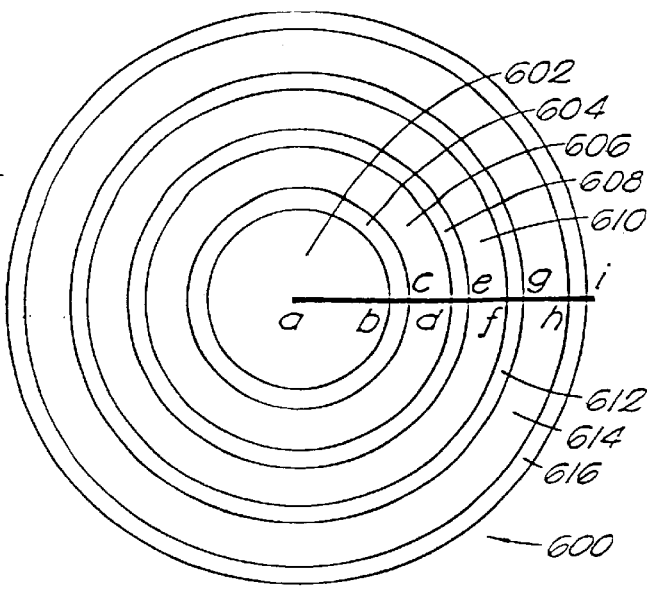
FIG. 6A is a simplified block diagram cross section of an exemplary structure.
Figure 6B:
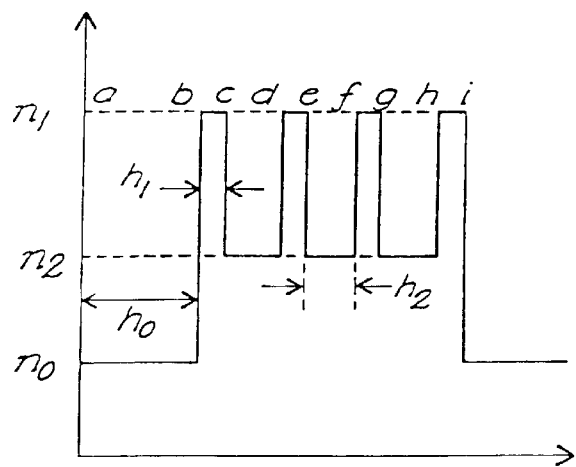
FIG. 6B is a corresponding cross section radial index of refraction profile of the structure in FIG. 6A.

FIG. 6A is a simplified block diagram cross section of an exemplary structure 600. FIG. 6B is a corresponding cross section radial index of refraction profile of the structure 600. The structure consists of concentric cylindrical layers 604–616 with alternating indices of refraction $n_1$, $n_2$ centered on a core 602 of low dielectric material $n_0$, such as air. The radius of the core is $h_0$ and the layer thicknesses are $h_1, h_2$. Note that an exemplary embodiment would involve each layer consisting of different material and corresponding different layer thickness. The parameters of the multilayer film are chosen such that light from any incident angle and polarization is completely reflected by the multilayer for the range of signal frequencies.

For example, for values of $n_0$, $n_1$, $n_2$, $h_1$, and $h_2$ as in FIG. 2B, light can be guided for any frequency within the two broadband omnidirectional reflection ranges 214 and 216. As is generally the case, the electromagnetic radiation will be multi-mode or single-mode depending on the size of the region in which it is confined. Thus, within each broadband range the electromagnetic radiation can be multi-mode or single mode depending on the size of the inner core region. For large core radii, the light will be multi-mode and for very small radii the light will be single mode.

Conventional optical fibers confine a propagating EM pulse by total internal reflection where the electromagnetic (EM) wave travels through a high index fiber core surrounded by low-index cladding. In accordance with the invention, the method of confinement in the Omniguide™ waveguide structure is the polarization independent omnidirectional reflectance of EM waves at the walls of the hollow fiber. The advantages of this mode of confinement are numerous.

There is very low loss associated with material absorption since the wave travels essentially through air, which is extremely low loss when compared with any dense medium. This enables low loss propagation which is of importance in basically every device that involves light guiding for communication, lasers and more.

Conventional optical communication fibers need amplification to compensate for absorption losses in the material, and to this end, the fiber is periodically doped with erbium. The use of erbium severely limits the bandwidth of the fiber. Since the structure of the invention is very low loss and does not need amplification, orders of magnitude increase in the usable bandwidth is possible. In addition, the omnidirectional multilayer structure provides a strong confinement mechanism and will propagate signals around very sharp bends as demonstrated in other systems with strong confinement mechanisms.

Such a multilayer coated fiber will also be important for improving the delivering power of a fiber tip in a near-field scanning optical microscope. The tip is used to deliver optical power with a spot size far smaller than the wavelength of light. Metal coating is currently employed in order to confine light to such a small length scale. Metal coatings have material absorption losses, which in this case limits the maximum delivery power. The fiber tip with a multilayer coating overcomes this problem since it is essentially lossless.

The ultimate goal is to create a hollow structure with walls made of a multilayer coating in accordance with the structure described heretofore. The structure may be of, but is not limited to, a cylindrical geometry. One method to produce such a structure is to take a thin wall hollow fiber made of glass or polymer and coat it with alternating layers of dielectrics. The layers could be made of a polymer or glass as the low refractive index component, and Germanium or Tellurium as the high index material. One would then take the fiber and evaporate a layer of prescribed thickness using a thermal evaporator or sputtering device. The subsequent low index layer would be deposited by dipping the fiber in a dilute solution of the polymer, or by evaporating a monomer followed by a rapid polymerization.

Figure 7:
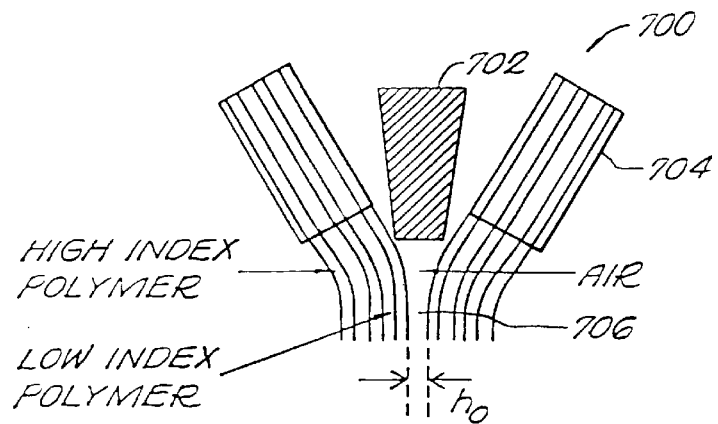
FIG. 7 is a cross section of a simplified schematic diagram of a coextrusion assembly in accordance with the invention.

Another exemplary method would be the coextrusion of the entire structure using a combination of immiscible polymers, one loaded with a high index component in a fine powder form the other without additives as in FIG. 7. FIG. 7 is a cross section of a simplified schematic diagram of a coextrusion assembly 700 in accordance with the invention. An extruding device 702 provides a structure 704 of alternating layers of high and low index polymer surrounding an air core 706.

Although the present invention has been shown and described with respect to several preferred embodiments thereof, various changes, omissions and additions to the form and detail thereof, may be made therein, without departing from the spirit and scope of the invention.

What is claimed is:

1. A device comprising:
   at least one dielectric inner core region in which electromagnetic radiation is confined; and
   at least two outer regions comprising dielectric material surrounding the inner core region, each with a distinct refractive index, said outer regions confining electromagnetic radiation within said inner core region, wherein
   the refractive indices, the number of outer regions, and thickness of the outer regions result in a reflectivity for a planar geometry that is greater than 95% for all angles of incidence ranging from 0° to at least 80° for all polarizations for a range of wavelengths of said electromagnetic radiation, and
   wherein during operation the outer regions guide the electromagnetic radiation within the dielectric inner core region.

2. The device of claim 1, wherein said inner core region comprises a low dielectric material.

3. The device of claim 2, wherein said inner core region comprises a gas.

4. The device of claim 3, wherein said inner core region comprises air.

5. The device of claim 1, wherein the outer regions comprise alternating layers of low and high dielectric materials.

6. The device of claim 5, wherein said low dielectric material comprises a polymer or a glass.

7. The device of claim 5, wherein said high dielectric material comprises germanium or tellurium.

8. The device of claim 1, wherein said device is utilized to guide electromagnetic radiation in a plurality of broadband region.

9. The device of claim 8, wherein the electromagnetic radiation in said broadband regions is single mode.

10. The device of claim 8, wherein the electromagnetic radiation in said broadband regions is multi-mode.

11. The device of claim 1, wherein said device comprises a circular cross section.

12. The device of claim 1, wherein said device comprises a rectangular cross section.

13. The device of claim 1, wherein said device comprises a triangular cross section.

14. The device of claim 1, wherein said device comprises a hexagonal cross section.

15. The device of claim 1, wherein said device is utilized to guide high power electromagnetic radiation.

16. The device of claim 1, wherein said device is utilized to guide high power electromagnetic radiation around bends.

17. The device of claim 1, wherein said device is utilized to guide electromagnetic radiation in at least one broadband region.

18. The device of claim 1, wherein said inner core region has dimensions on the order of the wavelength of said electromagnetic radiation.

19. The device of claim 1, wherein said inner core region has dimensions larger than the wavelength of said electromagnetic radiation.

20. The device of claim 1, wherein said device is utilized as a microcavity to confine electromagnetic radiation.

21. A microcavity comprising:
    at least one inner core region in which light is confined; and
    at least two outer regions surrounding the inner core region, each with a distinct refractive index, said outer regions confining light within said inner core region, wherein
    the refractive indices, the number of outer regions, and thickness of the outer regions result in a reflectivity for a planar geometry that is greater than 95% for all angles of incidence ranging from 0° to at least 80° for all polarizations for a range of wavelengths of said light.

22. A waveguide which exhibits omnidirectional reflection, comprising:
    at least one dielectric inner core region in which light is confined; and
    at least two outer regions comprising dielectric material surrounding the inner core region, each with a distinct refractive index, said outer regions confining light within said inner core region, wherein
    the refractive indices, the number of outer regions, and thickness of the outer regions result in a reflectivity for a planar geometry that is greater than 95% for all angles of incidence ranging from 0° to at least 80° for all polarizations for a range of wavelengths of said light, and
    wherein during operation the outer regions guide the electromagnetic radiation within the dielectric inner core region.

23. An article comprising:
    a dielectric inner core extending along an axis; and
    multiple dielectric layers surrounding the inner core about the axis,
    wherein the multiple dielectric layers define a refractive index variation that produce a range of frequencies for which there is omnidirectional reflection for electromagnetic radiation incident on the multiple dielectric layers from the dielectric inner core, the range of frequencies For which there is omnidirectional reflection being defined from above by an upper frequency $\omega_h$, corresponding to a photonic band edge for normally incident electromagnetic radiation and from below by a lower frequency $\omega_l$ corresponding to an intersection between a photonic band edge for TM electromagnetic radiation and a light line defined by the dielectric inner core.

24. The article of claims 23, wherein the axis is a waveguide axis and the alternating layers surround the inner core region about the waveguide axis to guide the electromagnetic radiation along the waveguide axis.

25. The article of claim 24, wherein the article comprises a circular cross section with respect to the waveguide axis.

26. The article of claim 24, wherein the article comprises a rectangular cross section with respect to the waveguide axis.

27. The article of claim 24, wherein the article comprises a triangular cross section with respect to the waveguide axis.

28. The article of claim 24, wherein the article comprises a hexagonal cross section with respect to the waveguide axis.

29. The article of claim 24, wherein the article is utilized to guide high power electromagnetic radiation.

30. The article of claim 24, wherein the article is utilized to guide high power electromagnetic radiation around bends.

31. The article of claim 23, wherein the multiple dielectric layers comprises alternating layers of high-index and low-index dielectric materials.

32. The article of claim 31, wherein the refractive index of the dielectric inner core is the refractive indices of the high-index and low-index materials are $n_1$ and $n_2$, respectively, the thicknesses of the high-index and low-index layers are $h_1$ and $h_2$, respectively, and $n_1 > n_2 > n_0$.

33. The article of claim 32, wherein the refractive indices and thicknesses cause $\omega_h > \omega_l$, where:

$$\omega_l = \omega_h + \frac{2c}{h_2 n_2 + h_1 n_1} \cos^{-1}\left(-\left|\frac{n_1 - n_2}{n_1 + n_2}\right|\right), \quad (6)$$

$$\frac{2c}{h_2\sqrt{n_2^2 - n_0^2} + h\sqrt{n_2^2 - n_0^2}} \cos^{-1}\left(\left|\frac{n_1^2\sqrt{n_2^2 - n_0^2} - n_2^2\sqrt{n_1^2 - n_0^2}}{n_1^2\sqrt{n_2^2 - n_0^2} + n_2^2\sqrt{n_1^2 - n_0^2}}\right|\right).$$

34. The article of claim 33, wherein the number of alternating layers is sufficient to cause the omnidirectional reflectivity to be greater than 95% for electromagnetic radiation incident on the alternating layers from the inner core at all angles ranging from 0° to 80° and all polarizations for all frequencies in the omnidirectional range of frequencies.

35. The article of claim 23, wherein said low dielectric material comprises a polymer or a glass.

36. The article of claim 35, wherein said high dielectric material comprises germanium or tellurium.

37. The article of claim 23, wherein said inner core region has dimensions larger than a wavelength of the electromagnetic radiation in the omnidirectional range of frequencies.

38. The article of claim 23, wherein said inner core region has dimensions on the order of a wavelength of the electromagnetic radiation in the omnidirectional range of frequencies.

39. The article of claim 23, wherein the refractive index variation produce a range to midrange ratio, defined as $(\omega_h - \omega_l)/[1/2)(\omega_h + \omega_l)]$, that is greater than or equal to 10%.

40. The article of claim 23, wherein the refractive index variation produce a range to midrange ratio, defined as $(\omega_h - \omega_l)/[(1/2)(\omega_h + \omega_l)]$, that is greater than or equal to 20%.

41. The article of claim 23, wherein the refractive index variation produce a range to midrange ratio, defined as $(\omega_h - \omega_l)/[(1/2)(\omega_h + \omega_l)]$, that is greater than or equal to 30%.

42. The article of claim 23, wherein the refractive index variation produce a range to midrange ratio, defined as $(\omega_h - \omega_l)/[(1/2)(\omega_h + \omega_l)]$, that is greater than or equal to 40%.

43. The article of claim 23, wherein said inner core region comprises a gas.

44. The article of claim 23, wherein the alternating layers complete surround the inner core to define a microcavity in which electromagnetic radiation is confined.

45. A waveguide comprising:
   a dielectric inner core extending along a waveguide axis; and
   alternating layers of high-index and low-index dielectric materials surrounding the inner core about the waveguide axis to guide electromagnetic radiation along the waveguide axis,
   wherein the refractive index of the dielectric inner core is $n_0$, the refractive indices of the high-index and low-index materials are $n_1$ and $n_2$, respectively, the thicknesses of the high-index and low-index layers are $h_1$ and $h_2$, respectively, and $n_1 > n_2 > n_0$, and
   wherein the refractive indices and thicknesses cause $\omega_h > \omega_1$, where:

$$\omega_l = \omega_h + \frac{2c}{h_2 n_2 + h_1 n_1} \cos^{-1}\left(-\left|\frac{n_1 - n_2}{n_1 + n_2}\right|\right), \quad (6)$$

$$\frac{2c}{h_2\sqrt{n_2^2 - n_0^2} + h\sqrt{n_2^2 - n_0^2}} \cos^{-1}\left(\left|\frac{n_1^2\sqrt{n_2^2 - n_0^2} - n_2^2\sqrt{n_1^2 - n_0^2}}{n_1^2\sqrt{n_2^2 - n_0^2} + n_2^2\sqrt{n_1^2 - n_0^2}}\right|\right).$$

46. The waveguide of claim 45, wherein the refractive indices and the thicknesses produce a range to midrange ratio, defined as $(\omega_h - \omega_l)/[(1/2)(\omega_h + \omega_1)]$, that is greater than or equal to 10%.

47. The waveguide of claim 46, wherein the range to midrange ratio is greater than or equal to 20%.

48. The waveguide of claim 47, wherein the range to midrange ratio is greater than or equal to 30%.

49. The waveguide of claim 48, wherein the range to midrange ratio is greater than or equal to 40%.

50. The waveguide of claim 45, wherein said inner core region has dimensions larger than a wavelength of the electromagnetic radiation in the omnidirectional range of frequencies.

51. The waveguide of claim 45, wherein the number of alternating layers is sufficient to cause the omnidirectional reflectivity to be greater than 95% for electromagnetic radiation incident on the alternating layers from the inner core at all angles ranging from 0° to 80° and all polarizations for all frequencies in the omnidirectional range of frequencies.

52. The waveguide of claim 45, wherein said inner core region comprises a gas.

53. The waveguide of claim 45, wherein said inner core region has dimensions on the order of a wavelength of the electromagnetic radiation in the omnidirectional range of frequencies.

\* \* \* \* \*

UNITED STATES PATENT AND TRADEMARK OFFICE
CERTIFICATE OF CORRECTION

PATENT NO.    : 6,603,911 B2
DATED         : August 5, 2003
INVENTOR(S)   : Fink et al.

It is certified that error appears in the above-identified patent and that said Letters Patent is hereby corrected as shown below:

Title page,
Item [56], References Cited, OTHER PUBLICATIONS, "M. Thumm" reference, replace "powr" with -- power --; and replace "pertubations" with -- perturbations --
"T. Iyama et al." reference, replace "Propagtion" with -- Propagation --

Column 1,
Line 16, replace "94003 34-DMR" with -- 9400334-DMR --

Column 2,
Line 57, insert -- and -- before "frequency"

Column 3,
Line 15, equation (2): replace "$K = \frac{i}{a}\ln\left(\frac{1}{2}Tr(U^{(a)}) \pm \left(\frac{1}{4}(Tr(U^{(a)}))^2 - 1\right)^{1/2}\right)$" with -- $K = \frac{i}{a}\ln\left(\frac{1}{2}Tr(U^{(a)}) \pm \left(\frac{1}{4}(Tr(U^{(a)}))^2 - 1\right)^{1/2}\right)$ --

Column 10,
Line 34, repalce "For" with -- for --
Line 36, replace "$\omega_h$," with -- $\omega_H$ --
Line 64, insert -- $n_0$, -- after "core is"

Column 11,
Line 4, delete "(6)"
Lines 4 through 10, replace "$\omega_h + \frac{2c}{h_2 n_2 + h_1 n_1}\cos^{-1}\left(-\left|\frac{n_1 - n_2}{n_1 + n_2}\right|\right),$ $$\omega_l = \frac{2c}{h_2\sqrt{n_2^2 - n_0^2} + h\sqrt{n_2^2 - n_0^2}}\cos^{-1}\left(\left|\frac{n_1^2\sqrt{n_2^2 - n_0^2} - n_2^2\sqrt{n_1^2 - n_0^2}}{n_1^2\sqrt{n_2^2 - n_0^2} + n_2^2\sqrt{n_1^2 - n_0^2}}\right|\right)$$"

with -- $\omega_h = \frac{2c}{h_2 n_2 + h_1 n_1}\cos^{-1}\left(-\left|\frac{n_1 - n_2}{n_1 + n_2}\right|\right),$ $$\omega_l = \frac{2c}{h_2\sqrt{n_2^2 - n_0^2} + h\sqrt{n_1^2 - n_0^2}}\cos^{-1}\left(\left|\frac{n_1^2\sqrt{n_2^2 - n_0^2} - n_2^2\sqrt{n_1^2 - n_0^2}}{n_1^2\sqrt{n_2^2 - n_0^2} + n_2^2\sqrt{n_1^2 - n_0^2}}\right|\right)$$ --.

Line 31, replace "$(\omega_h - \omega_l)/[½(\omega_h + \omega_l)]$" with -- $(\omega_h - \omega_l)/[(1/2)(\omega_h + \omega_l)]$ --

UNITED STATES PATENT AND TRADEMARK OFFICE
CERTIFICATE OF CORRECTION

PATENT NO. : 6,603,911 B2
DATED : August 5, 2003
INVENTOR(S) : Fink et al.

It is certified that error appears in the above-identified patent and that said Letters Patent is hereby corrected as shown below:

Column 12,
Line 4, replace "no," with -- $n_0$ --
Line 12, delete "(6)"

Lines 12-18, replace
$$\omega_h + \frac{2c}{h_2 n_2 + h_1 n_1} \cos^{-1}\left(-\left|\frac{n_1 - n_2}{n_1 + n_2}\right|\right),$$

$$\omega_l = \frac{2c}{h_2\sqrt{n_2^2 - n_0^2} + h\sqrt{n_1^2 - n_0^2}} \cos^{-1}\left(\left|\frac{n_1^2\sqrt{n_2^2 - n_0^2} - n_2^2\sqrt{n_1^2 - n_0^2}}{n_1^2\sqrt{n_2^2 - n_0^2} + n_2^2\sqrt{n_1^2 - n_0^2}}\right|\right)\text{" with}$$

$$-- \omega_h = \frac{2c}{h_2 n_2 + h_1 n_1} \cos^{-1}\left(-\left|\frac{n_1 - n_2}{n_1 + n_2}\right|\right),$$

$$\omega_l = \frac{2c}{h_2\sqrt{n_2^2 - n_0^2} + h\sqrt{n_1^2 - n_0^2}} \cos^{-1}\left(\left|\frac{n_1^2\sqrt{n_2^2 - n_0^2} - n_2^2\sqrt{n_1^2 - n_0^2}}{n_1^2\sqrt{n_2^2 - n_0^2} + n_2^2\sqrt{n_1^2 - n_0^2}}\right|\right) --.$$

Signed and Sealed this

Seventeenth Day of August, 2004

JON W. DUDAS
*Acting Director of the United States Patent and Trademark Office*